US007827836B2

(12) United States Patent
Cetnar

(10) Patent No.: US 7,827,836 B2
(45) Date of Patent: Nov. 9, 2010

(54) POWER RELEASE DOUBLE-LOCKING LATCH

(75) Inventor: Roman Cetnar, Newmarket (CA)

(73) Assignee: Magna Closures Inc., Newmarket (CA)

(*) Notice: Subject to any disclaimer, the term of this patent is extended or adjusted under 35 U.S.C. 154(b) by 402 days.

(21) Appl. No.: 11/573,381

(22) PCT Filed: Aug. 10, 2005

(86) PCT No.: PCT/CA2005/001227

§ 371 (c)(1),
(2), (4) Date: Feb. 7, 2007

(87) PCT Pub. No.: WO2006/015481

PCT Pub. Date: Feb. 16, 2006

(65) Prior Publication Data

US 2007/0210588 A1 Sep. 13, 2007

(51) Int. Cl.
*B60R 25/04* (2006.01)

(52) U.S. Cl. ............................ 70/257; 70/237; 70/277; 70/278.7; 292/201; 292/216; 292/DIG. 23

(58) Field of Classification Search .................. 70/237, 70/257, 264, 277, 278.6, 278.7; 292/201, 292/216, DIG. 23, DIG. 26, DIG. 27
See application file for complete search history.

(56) References Cited

U.S. PATENT DOCUMENTS 5,516,167 A * 5/1996 Hayakawa et al. .......... 292/337
5,577,782 A 11/1996 Johnson et al.
5,634,677 A 6/1997 Buscher et al.
5,899,508 A 5/1999 Cetnar et al.
5,938,252 A * 8/1999 Uemura et al. .............. 292/201
6,053,543 A 4/2000 Arabia, Jr. et al.
6,145,354 A 11/2000 Kondo et al.
6,338,508 B1 * 1/2002 Kleefeldt .................... 292/201
6,349,983 B1 2/2002 Dupont et al.
6,511,106 B2 1/2003 Perkins et al.
6,511,107 B2 1/2003 Barczynski et al.
6,733,052 B2 5/2004 Perkins et al.
6,764,113 B1 7/2004 Cetnar
6,786,070 B1 9/2004 Dimig et al.
7,070,213 B2 * 7/2006 Willats et al. ............... 292/216

(Continued)

FOREIGN PATENT DOCUMENTS

EP 0 564 066 A1 10/1993

(Continued)

*Primary Examiner*—Suzanne D Barrett
(74) *Attorney, Agent, or Firm*—Alex Porat; Magna International Inc.

(57) ABSTRACT

A power-release door lock system for an automotive door having a latch, including a ratchet (18) and pawl (20), and an electro-mechanical exterior latch release mechanism (220) for actuating the pawl to release the ratchet. The system includes a controller (210) and a pressure sensitive switch (216) mounted to an outside door handle (214) of the automotive door and electrically connected to the controller. The controller is programmed to disable the pressure sensitive switch in response to a predetermined "lock" signal and enable the pressure sensitive switch in response to a predetermined "unlock" signal, in which case the controller energizes the exterior latch release mechanism to release the ratchet in the event the pressure sensitive switch is actuated. The system eliminates the need for an exterior lock assembly and its attendant inside lock button or rod.

23 Claims, 10 Drawing Sheets

U.S. PATENT DOCUMENTS

| | | | | |
|---|---|---|---|---|
| 7,105,943 | B2 * | 9/2006 | Willats et al. | 307/10.1 |
| 7,145,436 | B2 * | 12/2006 | Ichikawa et al. | 340/5.72 |
| 7,210,715 | B2 * | 5/2007 | Kobayashi et al. | 292/336.3 |
| 7,293,806 | B2 * | 11/2007 | Umino | 292/216 |
| 7,363,788 | B2 * | 4/2008 | Dimig et al. | 70/277 |
| 2002/0074806 | A1 | 6/2002 | Perkins et al. | |
| 2003/0070457 | A1 | 4/2003 | Arlt et al. | |
| 2003/0080569 | A1 * | 5/2003 | Raymond et al. | 292/201 |
| 2003/0122426 | A1 * | 7/2003 | Aiyama et al. | 307/10.1 |
| 2003/0184098 | A1 * | 10/2003 | Aiyama et al. | 292/216 |
| 2005/0140148 | A1 * | 6/2005 | Stoof et al. | 292/216 |
| 2006/0237974 | A1 * | 10/2006 | Hamm et al. | 292/216 |
| 2007/0046035 | A1 * | 3/2007 | Tolley | 292/201 |
| 2008/0105011 | A1 * | 5/2008 | Machida et al. | 70/237 |

FOREIGN PATENT DOCUMENTS

| | | | |
|---|---|---|---|
| EP | 0647754 | A | 4/1995 |
| EP | 0805247 | A1 | 11/1997 |
| EP | 0916789 | A1 | 5/1999 |
| EP | 1103432 | A1 | 5/2001 |
| EP | 1 296 009 | A1 | 3/2003 |
| GB | 0322991 | | 11/2003 |
| WO | 0037755 | A | 6/2000 |

* cited by examiner

POWER RELEASE DOUBLE-LOCKING LATCH

FIELD OF ART

The invention generally relates to the field of automotive door latches or locks, and more particularly to power released, double-locking latches.

BACKGROUND OF INVENTION

Power release double-locking latches are known in the art. Such latches typically operate in conjunction with an outside door handle which has a mechanical lever that must be pulled open by the user. The actuation of the outside door handle lever is sensed by a controller, which then energizes a motor assembly for power release of the door latch. Because the power release double-locking latch typically mimics the operation of conventional manual latches, it becomes difficult to reduce the number of parts in such latches. The invention provides a more economical and sleek design for a power-release double-locking latch.

SUMMARY OF INVENTION

According to one aspect of the invention, a door lock system, including a latch, is provided for an automotive door. The latch includes a ratchet biased to a latched position and moveable to a released position, a pawl biased to engage the ratchet in the latched position, and an electro-mechanical exterior latch release mechanism for actuating the pawl to release the ratchet. The system also includes a controller, and a pressure sensitive switch, electrically connected to the controller, which is mounted on, in or proximate to an outside door handle of the automotive door. The controller is programmed to disable the pressure sensitive switch in response to a predetermined "lock" signal and enable the pressure sensitive switch in response to a pre-determined "unlock" signal, in which case the controller energizes the exterior latch release mechanism to release the ratchet in the event the pressure sensitive switch is actuated.

According to a further aspect of the invention, a latch is provided which includes: a housing; a ratchet, pivotally mounted to the housing, the ratchet being biased to a latched position and moveable to a released position; a pawl pivotally mounted to the housing and biased to engage the ratchet in the latched position; a first sector gear, pivotally mounted in the housing, for actuating the pawl to release the ratchet; a first motor assembly mounted in the housing for selectively driving the first sector gear; an arm rigidly connected to or integral with the first gear; and a cable connected to the arm for manually actuating the first sector gear and pawl, wherein the arm freewheels when the first sector gear is actuated by the first motor assembly.

According to a further aspect of the invention, a latch is provided which includes: (a) a latch housing having a first and a second surface, the first surface having a channel adapted to receive a striker; (b) a latch cover adapted to cooperate with the upper housing to form an interior cavity; a ratchet and pawl, each of the ratchet and pawl pivotally mounted to the first surface and a portion of the pawl extending into the interior cavity, the ratchet and pawl cooperatively operable to move between a latched position to hold the striker in the channel, and a released position to permit the striker from exiting the channel, the ratchet and pawl being biased towards the latched position; (c) an exterior latch release mechanism, mounted to the lower housing within the cavity, comprising a first means for actuating the pawl to release the ratchet and a first electromechanical means for selectively actuating the first pawl-actuating means; (d) an interior latch release and locking assembly, mounted to the lower housing within the cavity, comprising a second means for actuating the pawl to release the ratchet, means for connecting an inside release handle, and a second electromechanical means for selectively coupling or de-coupling the second pawl-actuating means from the handle-connecting means, the interior latch release and locking assembly being selectively operable to move between an unlocked state, wherein the handle-connecting means is kinematically coupled to the second pawl-actuating means, and a locked state, wherein the handle-connecting means is decoupled from the second pawl-actuating means; and (e) means comprising an arm on the pawl for driving the second electromechanical means into the unlocked state from the locked state, whenever the pawl is actuated to release the ratchet.

BRIEF DESCRIPTION OF THE DRAWINGS

The foregoing and other aspects of the invention will be understood and appreciated more fully from the following detailed description taken in conjunction with the following drawings, in which.

DETAILED DESCRIPTION OF PREFERRED EMBODIMENTS

Figure 5:
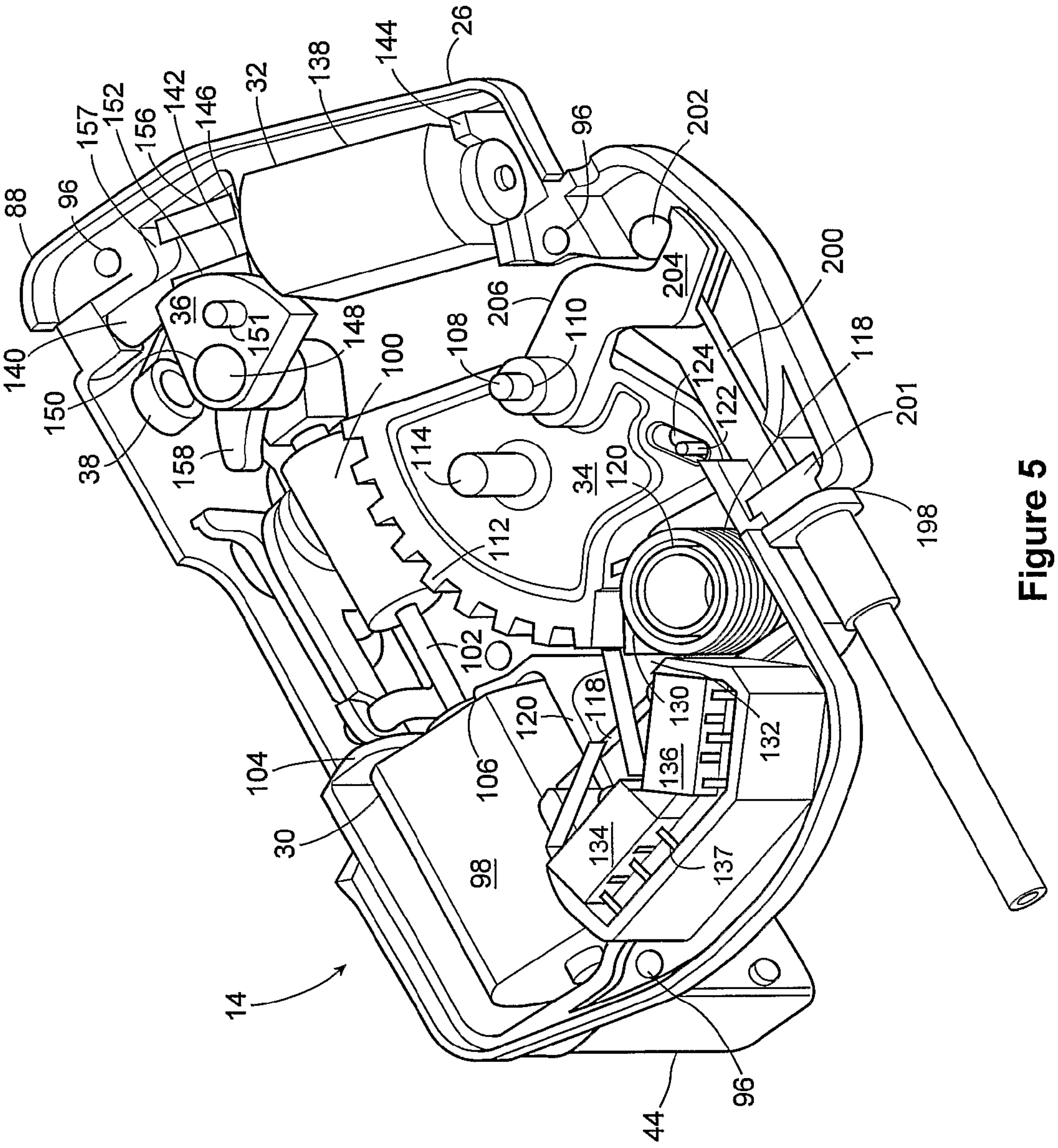
FIG. 5 shows a front perspective view of the interior of a lower portion of the latch shown in FIG. 2B.
Figure 7:
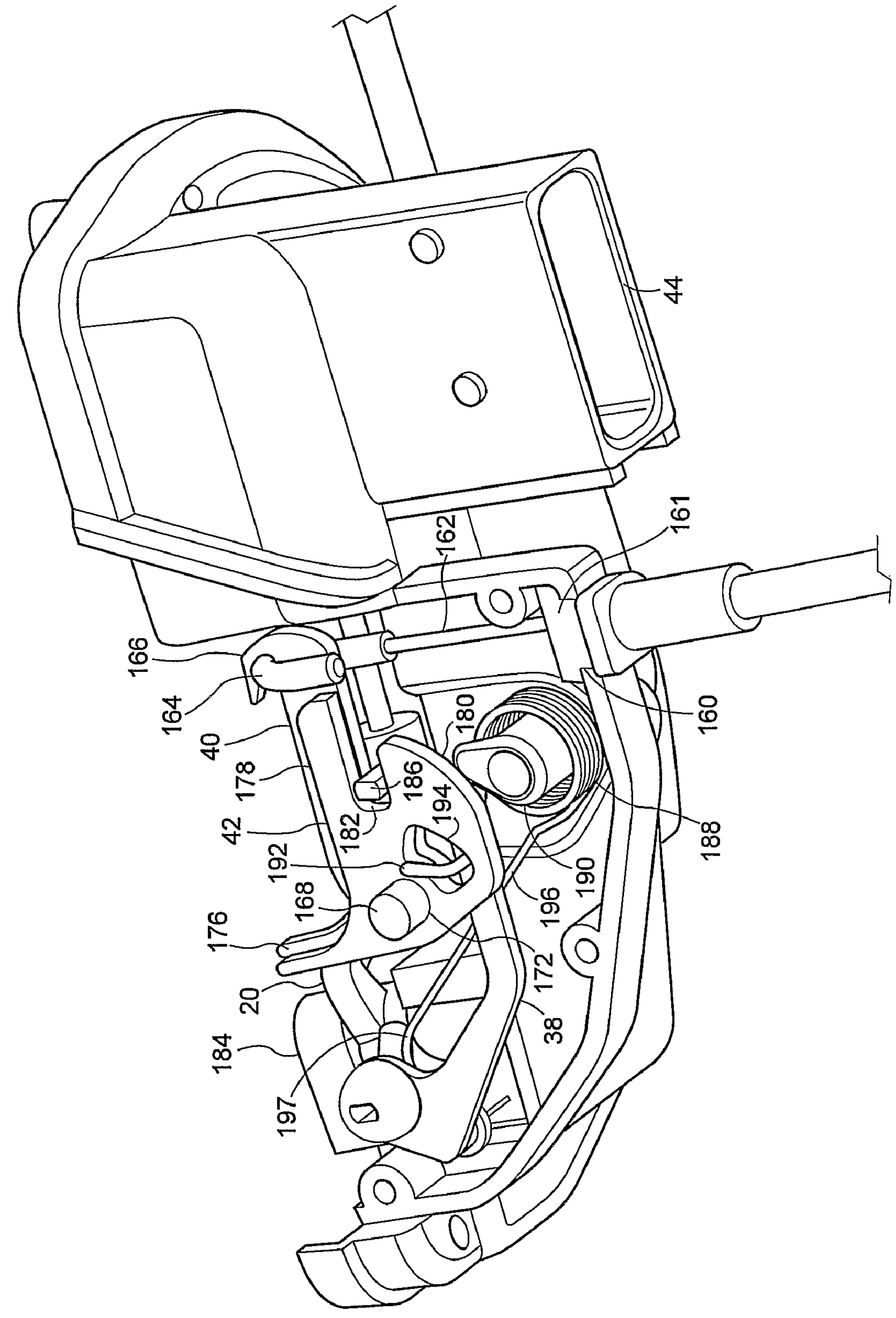
FIG. 7 shows a side perspective view of the lower portion of the latch shown in FIGS. 5 and 6, with a side plate removed.
Figure 8:
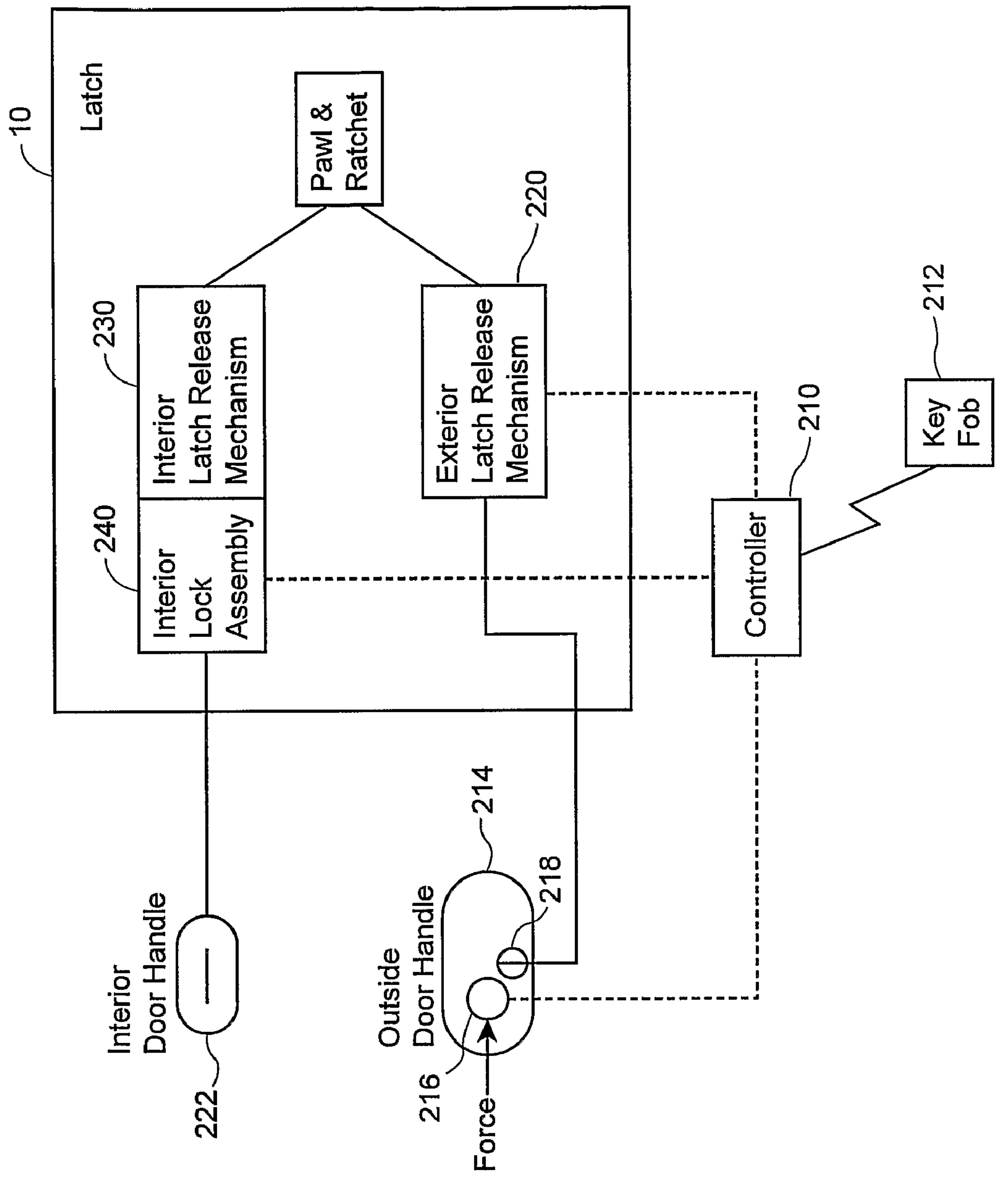
FIG. 8 is a schematic, system block diagram of the double-locking latch and its control inputs.

FIG. 8 shows a double-locking latch 10 in system-block form, comprising:

- a pawl and ratchet combination;
- an electromechanical exterior latch release mechanism 220 (the main elements of which are seen best in FIG. 5 and include a motor assembly 30, which drives a sector gear 34 having a projection 100 that interacts with the pawl);
- a substantially separate interior latch release mechanism 230 (the main elements of which are seen best in FIG. 7 and include a cable 162 (connectable to inside door handle 222), an inside release lever 40, an auxiliary inside release lever 42 which interacts with the pawl, and a door lock link 38 coupling levers 40 and 42); and
- an electro-mechanical interior lock assembly 240 (the main elements of which are seen best in FIGS. 5 and 7 and include a motor assembly 32 and sector gear 36, which control the door lock link 38 in order to selectively de-couple the inside release lever 40 from the auxiliary inside release lever 42).

As further shown in FIG. 8, the control inputs to the latch 10 comprise an inside door handle 222, an outside door handle 214, an electronic controller 210, and a device for signaling the electronic controller, such as a key fob 212.

In the illustrated system, the inside door handle 222 is a conventional door handle having a lever mechanically linked to the latch (via cable 162), whereby actuating the inside door handle lever induces a corresponding movement to a lever (inside release lever 42) in the interior latch release mechanism 230. The outside door handle 214, however, includes or is associated with a force or pressure sensitive switch 216 instead of a moveable lever. The switch 216 is connected to the controller 210 in order to provide a signal to unlock and release the latch. Upon receipt of this signal, the controller 210 energizes the exterior latch release mechanism 220 to activate the pawl and release the ratchet. Conversely, the controller 210 can lock the latch 10 from the outside, e.g., in response to a "lock" signal from the key fob 212, by simply disabling the pressure sensitive switch 216 or otherwise ignoring the input therefrom. Likewise, the controller 210 enables input from the pressure sensitive switch in response to a pre-determined signal, such as an "unlock" signal from the key fob 212. Accordingly, the illustrated system not only eliminates the need to pull a lever on the outside door handle, but it should also be appreciated that the system eliminates the need for an exterior lock assembly and its corresponding lock button or knob in the passenger compartment for the control thereof.

In the event of a power or controller failure, however, the outside door handle 214 does include or is otherwise associated with a key cylinder 218, which is mechanically coupled to the exterior latch release mechanism in order to activate the pawl to release the ratchet, as discussed in greater detail below.

From the interior, latch 10 is locked by mechanically de-coupling the inside door handle 222 from the interior latch release mechanism 230. This is electro-mechanically controlled by the interior lock assembly 240, which is selectively energized by the controller 210, as discussed in greater detail below. The latch 10 is "double locked" when the inside door handle 222 is de-coupled from the interior latch release mechanism 230 and the pressure sensitive switch 216 is disabled. This is useful for a variety of functions, as discussed in greater detail below.

Referring now to FIGS. 1-7, the double-locking latch is shown generally at 10. The latch 10 includes an upper latch portion 12 and a lower latch portion 14. The upper latch portion 12 includes a latch housing 16, a ratchet 18, a pawl 20, a front plate 22 and a backplate 24. The lower latch portion 14 includes a latch cover 26, a side plate 28, and the majority of the components associated with the exterior latch release mechanism 220, the interior latch release mechanism 230, and the interior lock assembly 240. The lower latch portion 14 also includes an electrical connector 44. Both latch housing 16 and lower latch cover 26 are preferably formed from a rigid thermoplastic material.

Figure 3:
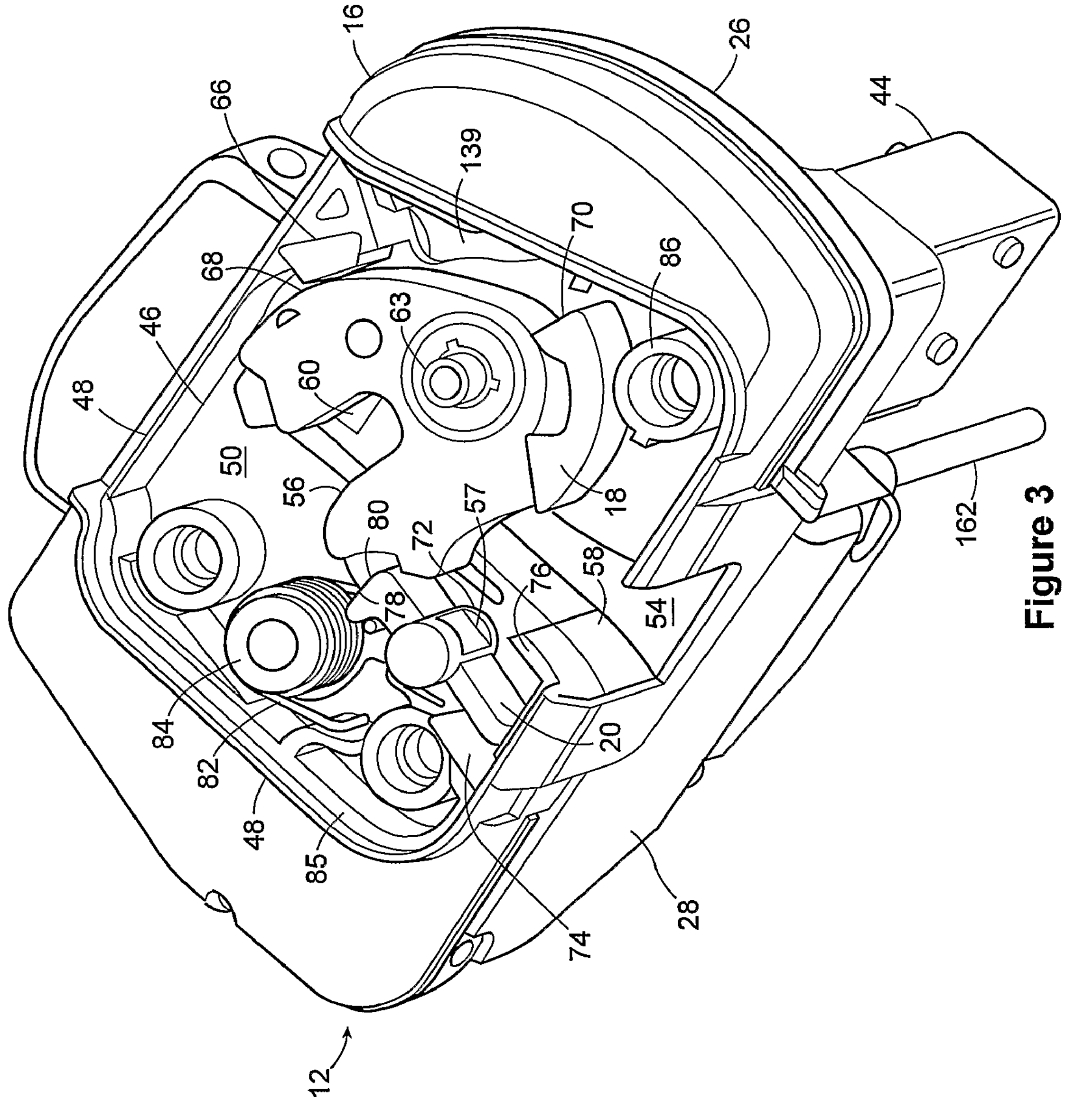
FIG. 3 is a front perspective view of an upper portion of the latch shown in FIG. 2A, with its front faceplate removed.
Figure 4:
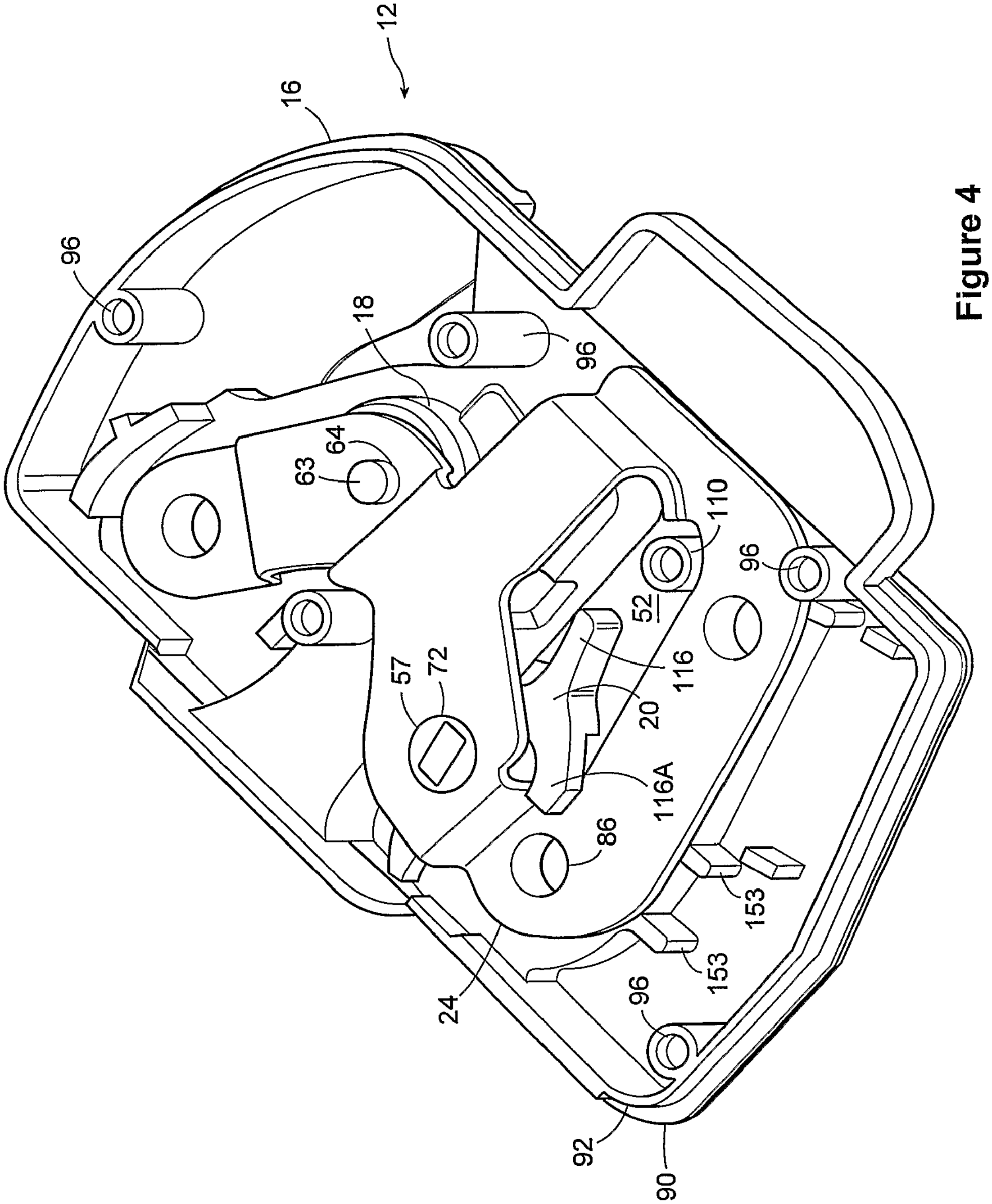
FIG. 4 is a rear perspective view of the upper portion of latch shown in FIG. 2A.

Referring now specifically to FIGS. 3 and 4, latch housing 16 includes a substrate 46 and peripheral walls 48 which define a cavity 50, and on the opposite side of substrate 46, a cavity 52. Ratchet 18 and pawl 20 are disposed in cavity 50. The metal backplate 24 is mounted to substrate 46 over cavity 52 using conventional fasteners, and provides reinforcement to the upper latch portion as well as a mounting surface for pawl 20 and ratchet 18. A frusto-trapezoidal channel, referred to as a "fishmouth" 54, bisects substrate 46. Fishmouth 54 is designed to receive a striker (not shown) which engages a hook 56 of the ratchet 18, as known in the art per se. Preferably, an elastomeric or rubber bumper 60 is mounted at the apex end of the fishmouth 38, abutting peripheral wall 62. The bumper 60 functions to receive and absorb the impact of the striker thus reducing the stresses on the latch and reducing noise.

Ratchet 18 is pivotally mounted to substrate 46 via a pin 63 inserted into aligned holes 64 (FIG. 1A) in substrate 46, front plate 22 and backplate 24, and is rotatable between a "latched" or "engaged" position, where the hook 56 is substantially perpendicular to fishmouth 54 to bar the striker from exiting fishmouth 54, and a "released" position, where the hook 56 is substantially parallel to fishmouth 54 as to permit free motion of the striker. The angular travel of ratchet 18 is delimited by the ratchet bumper 66, which is mounted into a niche of peripheral wall 48 and receives impact force from ratchet 18. A rear shoulder 68 of ratchet 18 strikes ratchet bumper 66 when ratchet 18 rotates into the engaged position, and a stop arm 70 of ratchet 18 strikes ratchet bumper 66 when ratchet 18 rotates into the released position.

Pawl 20 is pivotally mounted to latch housing 16 by a pawl axle 57 that is inserted into aligned holes 72 in front plate 22 and backplate 24. The angular travel of pawl 20 is delimited by a pawl bumper 74 and a wall segment 76 of peripheral wall 48, and provides an "engaged" position, where a pawl shoulder 78 abuts a hook shoulder 80 on ratchet 18 (forcing ratchet 18 into its engaged position), and a "released" position, where ratchet 18 rotates into its released position. A torsion spring 82 is installed around a post 84 formed in substrate 46 in order to bias pawl 20 in the engaged position.

Ratchet 18 and pawl 20 are preferably constructed out of metal but covered with a plastic material in order to reduce noise during operation. Certain portions subject to wear, such as pawl shoulder 78 and hook shoulder 80 are not covered by plastic.

Referring back to FIG. 2A and 3, front plate 22 is mounted on a lip 85 of latch housing 16 and provides a tight seal against peripheral walls 48. Front plate 22 is secured in place via bolts or screws that pass through aligned fastener holes 86 formed in front plate 22, latch housing 16 and back plate 24 (FIG. 4). A sidewall 88 on lower latch cover 26 (FIG. 5) engages against a lip 90 and further abuts a sidewall 92 on latch housing 16 (FIG. 4) to ensure a tight seal between latch housing 16 and latch cover 26 when the two are mounted together. The upper latch portion 12 is secured to the lower latch portion 14 by a plurality of cover screws 94 that are threaded through aligned reinforced cover holes 96 on both latch cover 26 and latch housing 16.

As previously mentioned, both the exterior and the interior latch release mechanisms 220, 230 act upon pawl 20 to release ratchet 18. The exterior latch release mechanism 220, manipulated by the outside door handle 214, is substantially separate from the interior latch release mechanism 230, which is actuated by the inside door handle 222.

Figure 6:
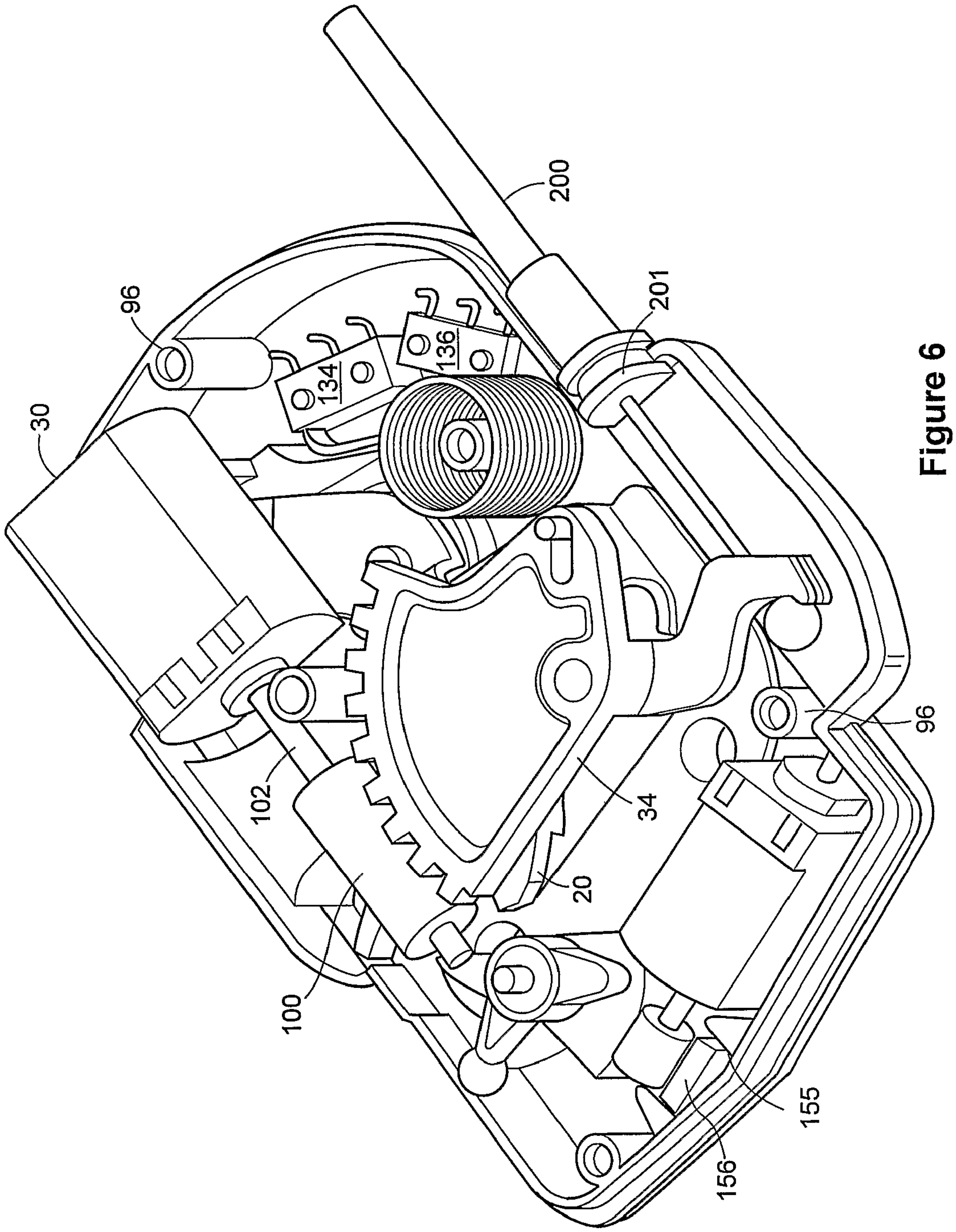
FIG. 6 shows a rear perspective view of the interior of the lower portion of the latch shown in FIG. 2B.

The exterior latch release mechanism 220 is discussed greater detail with specific reference to FIGS. 5 and 6. The mechanism 220 includes a power release motor assembly 30, which comprises a motor 98 coupled to a worm 100 by a shaft 102. Worm 100 drives a power release sector gear 34 (described in greater detail below). Motor 98 is mounted in a motor housing 104 that includes a shaft gap 106 in the sidewall of motor housing 104. Power release motor assembly 30 is electrically connected via electrical connector 44 to the force or pressure sensitive switch 216 mounted to the outside door handle 214. When the latch is electronically unlocked, the switch 216 signals the controller 210 to energize the power release motor assembly 30 upon the application of force or pressure to the outside door handle 214. When the door is electronically locked, the switch 216 is disabled. Other types of outside door handle switches will occur to those of skill in the art. The door may be electronically locked when a user activates a door lock/unlock switch inside the vehicle, on remote key fob 212, or optionally, via the controller 210 once the vehicle begins to move. The door may be electronically unlocked when the user activates a door lock/unlock switch inside the car, or on the remote key fob.

Power release sector gear 34 is rotatably mounted to the surface of latch cover 26 by a pin 108 that snaps into aligned sector mount holes 110 provided on latch cover 26 (not shown), power release sector gear 34, and latch housing 16 (FIG. 4). The rotational path of power release sector gear 34 defines a "resting" position where power release sector gear 34 is closest to motor 98, and an "activated" position where power release sector gear is furthest away from motor 98. The teeth 112 of power release sector gear 34 are coupled with worm 100 so that engaging motor 98 rotates power release sector gear 34 towards the activated position. A projection 114 extends out perpendicularly from the surface of power release sector gear 34 and abuts against a sector arm 116 on pawl 20 (FIG. 4). As power release sector gear 34 rotates into the activated position, pawl 20 is actuated by projection 114 into its released position, releasing ratchet 18.

A power release return spring 118 is mounted to a post 120 formed in latch cover 26 and biases power release sector gear 34 into its resting position. A hooked spring arm 122 extends from power release return spring 118 and hooks into a tab slot 124 in power release sector gear 34. A straight spring arm 126 also extends outwards from power release return spring 118 and abuts a wall portion 128 of latch cover 26. As power release sector gear 34 rotates to the activated position, the position of tab slot 124 also moves to so that hooked spring arm 122 abuts the sidewall of tab slot 124. Then, as power release sector gear 34 continues to rotate, power release return spring 118 rotates in the opposite direction, compressing straight spring arm 126. As soon as power release motor assembly 30 disengages, straight spring arm 126 decompresses and power release return spring 118 urges power release sector gear 34 back into the resting position. A pair of power release bumpers 130 are mounted in a pair of niches 132 in latch cover 26 to absorb the impact of power release sector gear 34 in both the resting position and the activated position.

A door ajar switch 134 and a door open switch 136 are mounted into a switch niche 137 formed in latch cover 26. As ratchet 18 rotates into the open position (FIG. 2A), a cam 70 on ratchet 18 rotates through an opening 139 in latch housing 16, first triggering a door ajar switch 134 and then a door open switch 136. Door ajar switch 134 and door open switch 136 have a plurality of terminals that are attached to a wiring harness (not shown) that is preferably electrically connected to indicators (audio and visual) in the vehicle cabin via electrical connector 44.

The interior latch release mechanism 230 and interior lock assembly 240 are discussed greater detail with specific reference to FIGS. 5 to 7. The interior latch release mechanism 230 includes inside release lever 40, auxiliary inside release lever 42, and door lock link 38, whereas interior lock assembly 230 includes motor assembly 32, sector gear 36, and door lock link 38.

Door lock motor assembly 32 includes a reversible motor 138 coupled to a worm 140 by a shaft 142. Motor 138 is connected to controller 210 via electrical connector 44, and operable by remote key fob 212 or other signal-providing device. When energized, motor assembly 32 selectively drives sector gear 36 into a "locked" or "unlocked" position (described below). Motor 138 is mounted in a motor housing 144 that provides a shaft gap 146 in the sidewall of motor housing 144.

Figure 1A:
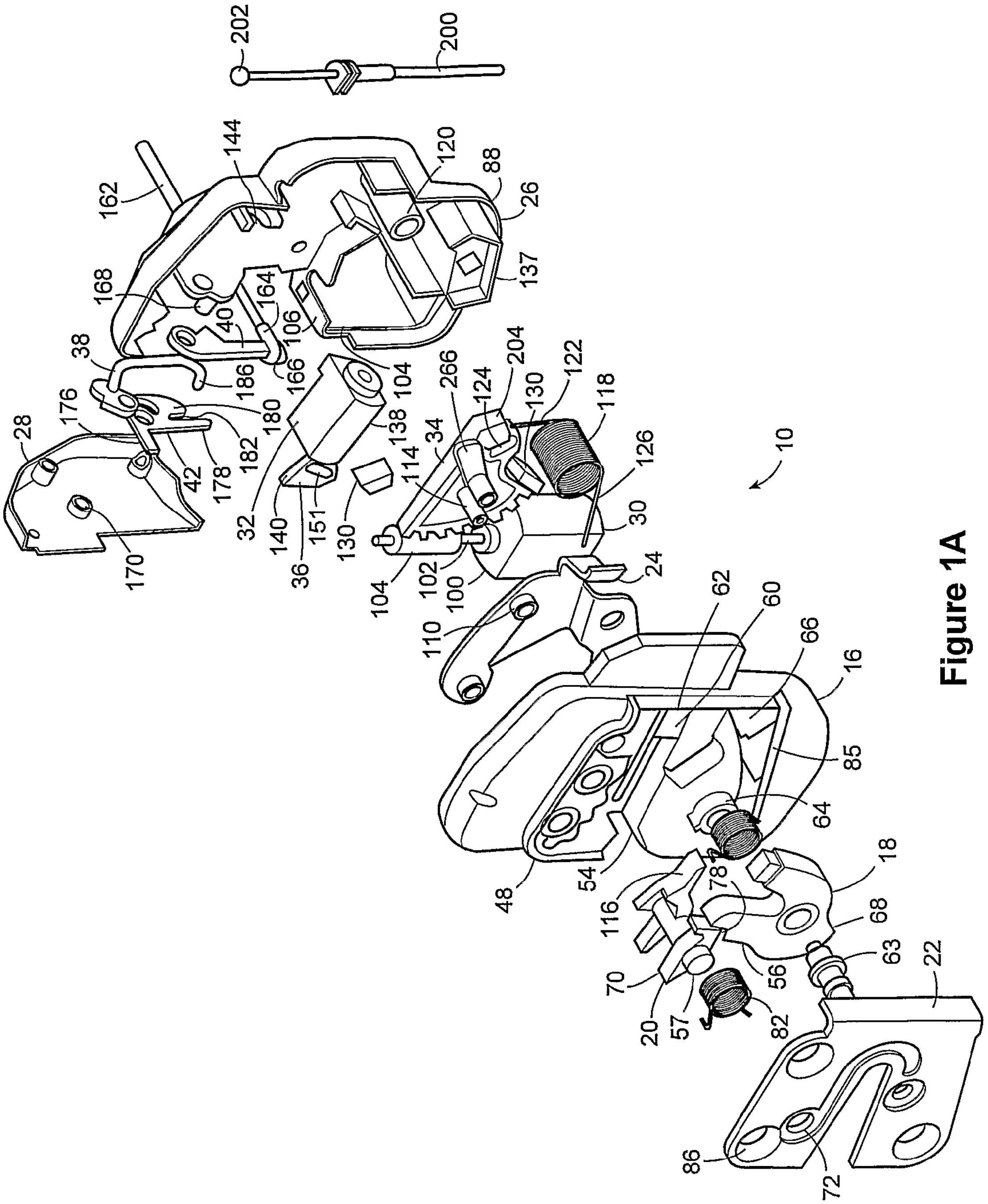
FIGS. 1A and 1B are exploded views of a double-locking latch, taken from reverse angles.
Figure 1B:
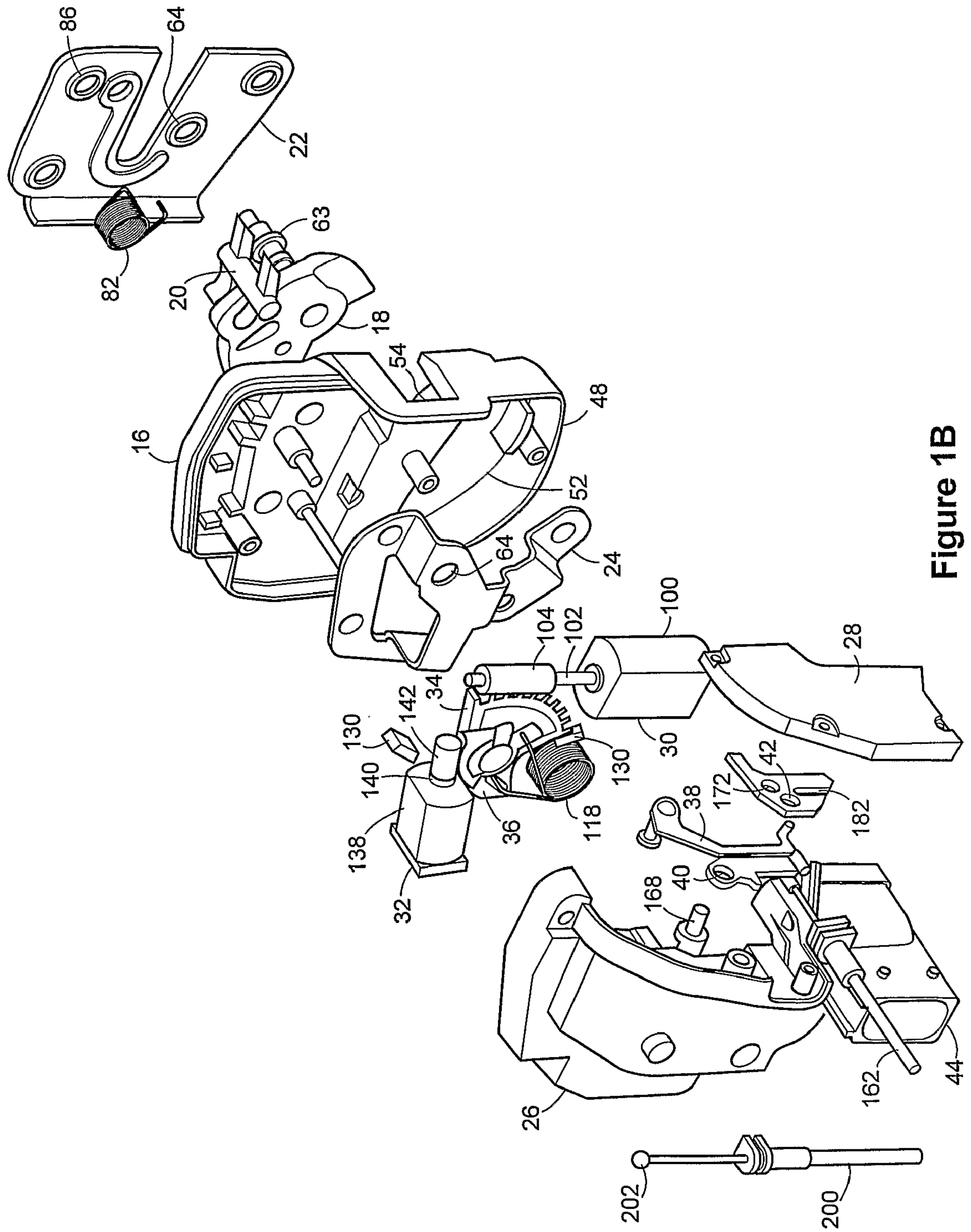
Figure 2A:
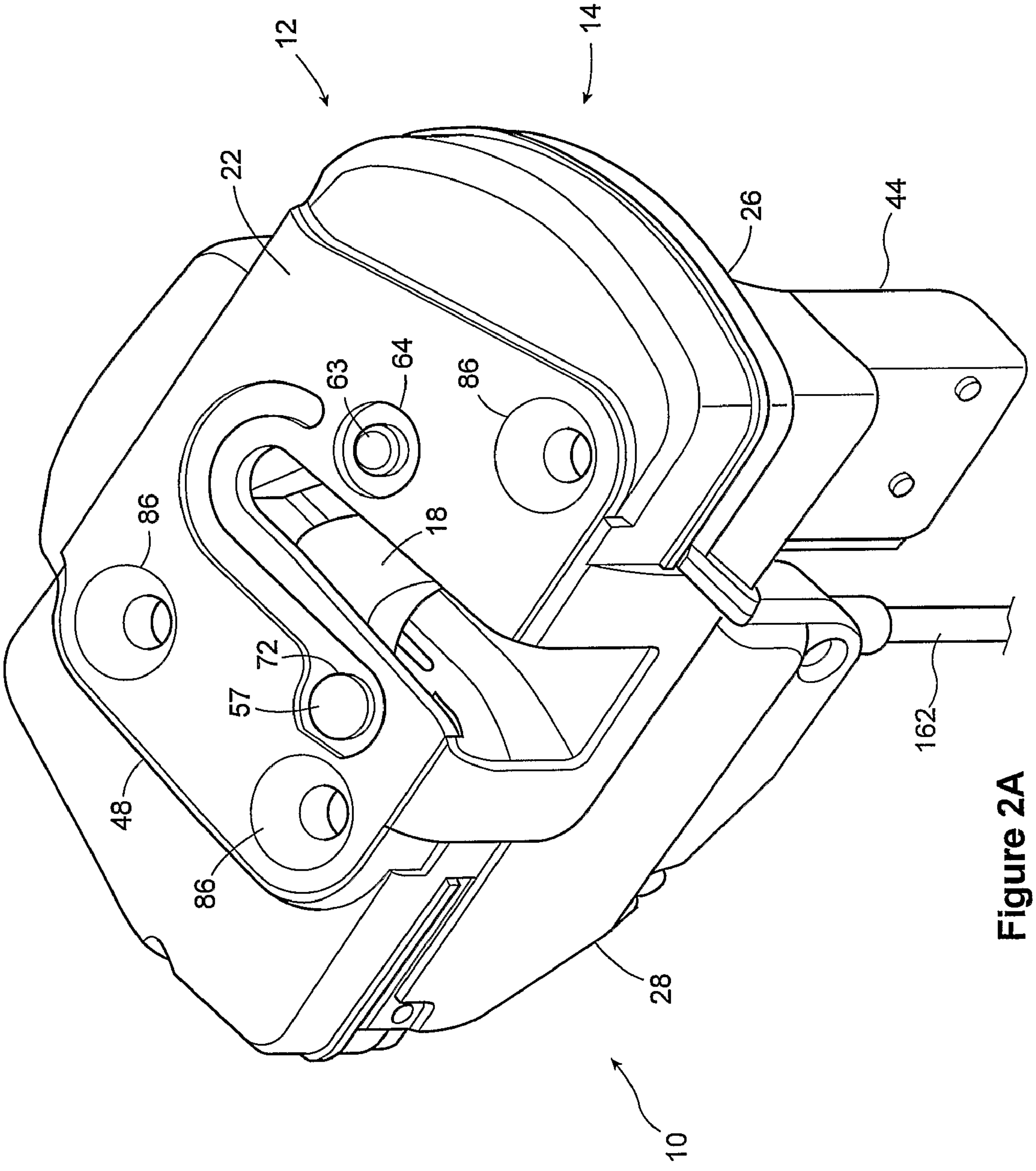
FIGS. 2A and 2B are perspective views of the latch shown in FIGS. 1A and 1B, taken from reverse angles.
Figure 2B:
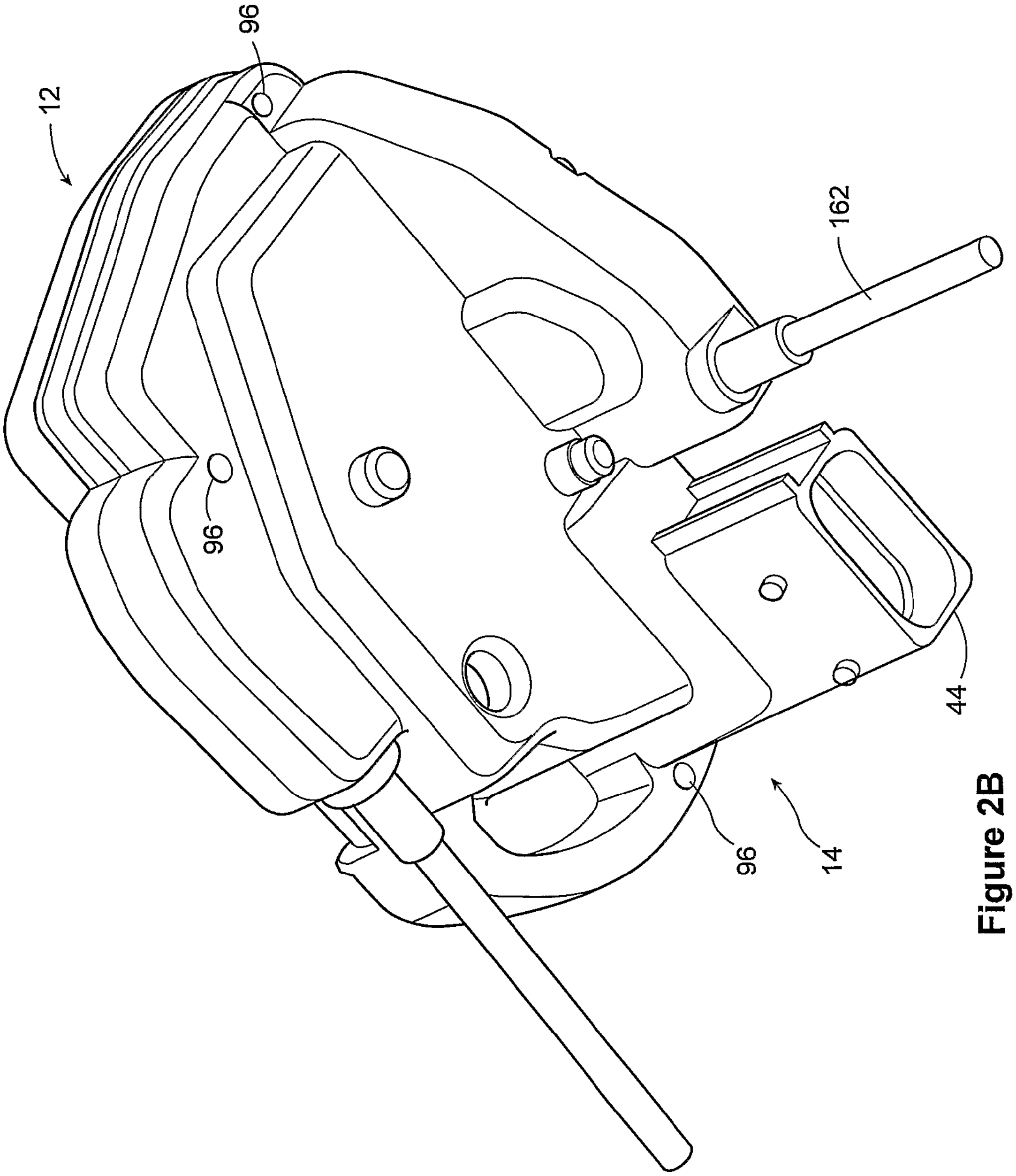

Sector gear 36 is rotatably mounted to the latch cover 26 by a pin 148 that snaps into aligned sector mount holes 150 provided on latch cover 26 (not shown) and sector gear 36. The teeth 152 of sector gear 36 are coupled with worm 140 so that engaging motor 138 selectively rotates sector gear 36 into its "locked" position, where the sector gear 36 is furthest from motor 138, or its unlocked position, where the sector gear 36 is closest to motor 138. The angular travel of sector gear 36 is delimited by a pin 151 that extends from the surface of the gear 36 and abuts one of a pair of sector tabs 153 that depend from the lower surface of substrate 46 (FIG. 4). A door lock arm 154 extends outwards from the sector gear 36 (FIG. 1B). When the sector gear 36 rotates into the locked position, door lock arm 154 engages a door lock switch 155 that is mounted in a niche 156 in latch cover 26. When the sector gear 36 rotates into the unlocked position, door lock arm 154 disengages from door lock switch 155. Door lock switch 155 has a plurality of terminals that are attached to a wiring harness (not shown) that is electrically connected to indicators (audio and visual) in the vehicle cabin via electrical connector 44.

Referring now to FIG. 7, a cable hole 160 is provided in latch cover 26 to provide access for inside handle release cable 162 from outside of latch cover 26. A flange 161 provided at the end of the cladding ensures a tight seal. One end of inside handle release cable 162 is coupled with the inside handle 222 of the vehicle door (not shown). The other end of inside handle release cable 162 terminates in a hook 164 that is coupled with a hook end 166 of inside release lever 40. Inside release lever 40 is rotatably mounted to a post 168 on lower cover 26 (FIG. 1B), so that actuating inside handle release cable 162 rotates inside release lever 40. Post 168 terminates in a hole 170 on side plate 28 (FIG. 1A).

Auxiliary inside release lever 42 includes an integrally formed hole 172 that allows auxiliary inside release lever 42 to rotatably mount to post 168 between inside release lever 40 and side plate 28. Auxiliary inside release lever 42 further includes a pawl arm 176, a link arm 178 and a door lock hook 180. Pawl arm 176 abuts pawl 20, so that when auxiliary inside release lever 42 is rotated around hole 174, pawl 20 is actuated into its released position. A slot 182 is formed in auxiliary inside release lever 42 between link arm 178 and door lock hook 180. Link arm 178 is longer than door lock hook 180.

Door lock link 38 is pivotally coupled at a first end to a door lock arm 184 on sector gear 36 (FIG. 1B), kinematically coupled with inside release lever 40 at the second end, and is also selectively kinematically coupled with auxiliary inside release lever 42 at the second end. A depending tab 186 is provided at the second end of door lock link 38 that abuts both inside release lever 40 and auxiliary inside release lever 42. Engaging door lock sector gear 36 moves door lock link 38 so that depending tab 186 slides into and out of slot 182 on auxiliary inside release lever 42. When door lock sector gear 36 is in the unlocked position, door lock link 38 is in its "coupled" position, so that depending tab 186 is positioned within slot 182, abutting both link arm 178 and door lock hook 180. When door lock sector gear 36 is in the locked position, door lock link 38 is in its "uncoupled" position, so that depending tab 186 is outside of slot 182, abutting only door lock link arm 178. Thus, when inside release lever 40 is actuated while door lock link 38 is in its coupled position, inside release lever 40 pushes on depending tab 186, causing both door lock link 38 and auxiliary inside release lever 42 to rotate, and thus have pawl arm 176 actuate pawl 20. When inside release lever 40 is actuated while door lock link 38 is in its uncoupled position, inside release lever 40 still actuates door lock link 38. However, since depending tab 186 is now situated outside of slot 182, auxiliary inside release lever 42 does not rotate and actuate pawl 20.

An inside release spring 188 is mounted to a post 190 formed in latch cover 26 and biases auxiliary inside release lever 42 towards its engaged position. A hooked spring arm 192 extends from inside release spring 188 and hooks into a tab slot 194 in auxiliary inside release lever 42. Another spring arm 196 also extends outwards from inside release spring 188 and is biased against a wall portion 197 of latch cover 26. As auxiliary inside release lever 42 rotates clockwise, the position of tab slot 194 also moves to so that hooked spring arm 192 abuts the sidewall of tab slot 194. Then, as auxiliary inside release spring 188 continues to rotate clockwise, inside release spring 188 counterclockwise, compressing spring arm 196. As soon as inside handle release cable 162 disengages, spring arm 196 decompresses and inside release spring 188 urges auxiliary inside release lever 42 back into its held position.

Sector gear 36 further includes a safety backup arm 158. When the sector gear 36 is in the locked position, safety backup arm 158 is positioned into the rotational path of an arm 116A on pawl 20 (see FIG. 4) so that, if actuated, pawl arm 116A will force sector gear 36 into the unlocked position. When door lock sector gear 36 is in the unlocked position, safety backup arm 158 is not within the rotational path of pawl arm 116A. In this manner, the exterior release latch mechanism 220 is mechanically coupled to the interior lock assembly 240. Safety backup arm 158 provides a mechanical means to move sector gear 36 into the unlocked position from the locked position, and thus preclude the possibility of a person entering the passenger cabin and thereafter being unable to open the vehicle door from the interior due to the inside door handle 222 being decoupled from the interior latch release mechanism 230 as a result of a power failure or other problem with motor assembly 32.

Referring back to FIG. 5, a cable hole 198 is provided in latch cover 26 to provide access for an emergency key release cable 200. A flange 201 provided at the end of the cladding ensures a tight fit. One end of emergency key release cable 200 is coupled to a lever in the key cylinder 218, which is accessible from the exterior of the vehicle door. The other end of emergency key release cable 200 terminates in a ball hook 202 that abuts a hook end 204 of a manual arm 206 on power release sector gear 34. When emergency key release cable 200 is actuated, manual arm 206 rotates power release sector gear 34 mechanically into the activated position. As described above, moving pawl 20 to the released position will also rotate sector gear 36 into the unlocked position if it is currently in the locked position. Additionally, as with the normal motor-powered opening of power release sector gear 34, power release return spring 118 will urge power release sector gear 34 back into the resting position once emergency key release cable 200 is disengaged. During normal motor-powered opening of power release sector gear 34, the manual arm 206 free-wheels without actuating emergency key release cable 200 or otherwise affecting the operation of the power opening/closing cycle.

If desired, since the emergency key release cable 200 is intended to be used only when there is no power available to engage power release motor 98, the key cylinder 218 on the exterior of the vehicle may be hidden from view by a slidable cover to enhance the aesthetics of the door. The key cylinder may be mounted on, in, or otherwise in the general vicinity of the outside door handle, as desired.

In operation, pawl 20 can be actuated to allow ratchet 18 to move from the engaged position to the released position by: (a) actuating the inside release lever 40 when sector gear 36 is in the unlocked position; (b) energizing power release motor assembly 30 when sector gear 36 is in the unlocked position; or (c) actuating the emergency key release cable 200 regardless of whether or not the sector gear 36 is in the locked or unlocked position. Under the first option (a), when the sector gear 36 is in the unlocked position, actuating the inside release handle 22 moves inside handle release cable 162 and actuates inside release lever 40, which, in turn, engages door lock link 38. Depending tab 186 on door lock link 38 actuates auxiliary inside release lever 42, which engages pawl 20 to release ratchet 18. When the sector gear 36 is in the locked position, door lock link 38 freewheels without actuating auxiliary inside release lever 42. Under the second option (b), power release motor assembly 30 drives power release sector gear 34. A projection on power release sector gear 34 actuates sector arm 116 on pawl 20 to release ratchet 18. Alternatively, under the third option (c), manually actuating emergency key release cable 200 by turning a key cylinder actuates power release sector gear 34 in lieu of power release motor assembly 30.

Typically, unlocking the vehicle by pressing an unlock/lock control on a remote key fob causes the interior locking assembly 240 to enter into an unlocked state (by energizing door lock motor assembly 32 to move door lock sector gear 36 into the unlocked position) and enables the pressure sensitive switch 216 on the outside door handle 214. Thus, both the exterior and the interior door handles are operable to open the latch. Unlocking the vehicle by pressing an unlock/lock control located (such as a rocker switch) inside the vehicle when it is in a locked state preferably only disables the pressure sensitive switch 216 on the outside handle 214. Thus, double-locking can only be done by pressing lock/unlock button on the remote key fob. Unlocking the vehicle by pressing an unlock/lock button inside the vehicle that is in a double locked state preferably causes no change to the interior or exterior latch release mechanisms 220, 230.

It is contemplated that variations on the double-locking system will occur to those of skill in the art. For example, as a safety feature, the pressure sensitive switch 216 on each of the outside door handles of the vehicle could be electronically deactivated after the vehicle begins to move (auto lock feature). Alternatively, for each of the rear doors of a vehicle, door lock motor assembly 32 may not drive door lock sector gear 36 into the unlocked position unless a child lock switch is disengaged. This switch could be placed on a dashboard or in another location not accessible from the rear seat. Other variations will occur to those of skill in the art without departing from the spirit of the invention.

What is claimed is:

1. A door lock system for an automotive door, comprising:

a latch, including a ratchet (18) biased to a latched position and moveable to a released position, a pawl (20) biased to engage the ratchet in the latched position;

a controller (210);

an electromechanical exterior latch release mechanism (220) for actuating the pawl to release the ratchet;

an interior latch release mechanism (230) for actuating the pawl to release the ratchet;

an electromechanical interior locking assembly (240), electrically connected to the controller, for selectively decoupling the interior latch release mechanism from the pawl;

a pressure sensitive switch (216) actuatable by an outside door handle (214) of the automotive door and electrically connected to the controller;

wherein said controller is programmed to disable the pressure sensitive switch in response to a predetermined "lock" signal and enable the pressure sensitive switch in response to a pre-determined "unlock" signal, in which case the controller energizes the exterior latch release mechanism to release the ratchet in the event the pressure sensitive switch is actuated.

2. A system according to claim 1, wherein the exterior latch release mechanism comprises a first gear (34) for actuating the pawl to release the ratchet and a first motor assembly (30), electrically connected to the controller, for driving the first gear (34).

3. A system according to claim 1, including a key cylinder (218), mounted on, in or proximate to the outside door handle, the key cylinder being kinematically connected to the first gear (34) for mechanically actuating the pawl to release the ratchet.

4. A system according to claim 3, wherein the key cylinder is connected to the first gear (34) via a cable (200) connected to an arm (206) rigidly connected to the first gear (34), the arm (206) freewheeling when the first gear (34) is actuated by the first motor assembly (30).

5. A system according to claim 4 including an inside door handle (222) connected to the interior latch release mechanism (230).

6. A system according to claim 5, wherein the interior latch release mechanism comprises:

an inside release lever (40) pivotally mounted in the latch, the inside release lever being connected via a cable to the inside release handle;

an auxiliary release lever (42) pivotally mounted in the latch, the auxiliary release lever being engagable with the pawl; and a link element (38) moveable between an unlocked position, wherein the inside release lever is kinematically coupled with the auxiliary release lever, and a locked position, wherein the inside release lever is kinematically de-coupled from the auxiliary release lever such that actuation of the inside release lever does not cause a corresponding movement of the auxiliary release lever.

7. A system according to claim 6, wherein the electromechanical interior locking assembly comprises:

a second gear (36) connected to the link element; and a second motor assembly (32), electrically connected to the controller, for driving the second gear (36) and the link element connected thereto between the locked and unlocked positions.

8. A system according to claim 7, wherein the second gear (36) includes a safety backup arm (158) that is positioned into the rotational path of an arm (116A) on the pawl when the second gear (36) is in the locked position so that, if actuated, the pawl arm forces the second gear (36) and the link element into the unlocked position.

9. A system according to claim 5, wherein the pawl couples the exterior latch release mechanism to the interior lock assembly.

10. A latch, comprising:

a housing;

a ratchet (18), pivotally mounted to the housing, the ratchet being biased to a latched position and moveable to a released position;

a pawl (20) pivotally mounted to the housing and biased to engage the ratchet in the latched position;

a first gear (34), pivotally mounted in the housing, for actuating the pawl to release the ratchet;

a first motor assembly (30) mounted in the housing for selectively driving the first gear (34);

an arm (200) rigidly connected to or integral with the first gear (34); and a cable (200) connected to the arm for manually actuating the pawl, wherein the arm freewheels when the first gear (34) is actuated by the first motor assembly (30).

11. A latch according to claim 10, including:

an inside release lever (40) pivotally mounted to the housing;

an auxiliary release lever (42), pivotally mounted to the housing, the auxiliary release lever being engagable with the pawl; and a link element (38) moveable between an unlocked position, wherein the inside release lever is kinematically coupled with the auxiliary release lever, and a locked position, wherein the inside release lever is kinematically de-coupled from the auxiliary release lever such that actuation of the inside release lever does not cause a corresponding movement of the auxiliary release lever.

12. A latch according to claim 11, including:

a second gear (36), pivotally mounted to the housing, and connected to the link element; and a second motor assembly (32) mounted in the housing for selectively driving the second gear (36) and the link element connected thereto between the locked and unlocked positions.

13. A latch according to claim 12, wherein the second gear (36) includes a safety backup arm (158) that is positioned into the rotational path of an arm (116A) on the pawl when the second gear (36) is in the locked position so that, if actuated, the pawl arm forces the second gear (36) and the link element into the unlocked position.

14. A latch for an automotive door, comprising:

a latch housing having a first and a second surface, the first surface having a channel adapted to receive a striker;

a latch cover adapted to cooperate with the latch housing to form an interior cavity;

a ratchet and pawl, each of the ratchet and pawl pivotally mounted to the first surface and a portion of the pawl extending into the interior cavity, the ratchet and pawl cooperatively operable to move between a latched position to hold the striker in the channel, and a released position to permit the striker to exit the channel, the ratchet and pawl being biased towards the latched position;

an exterior latch release mechanism, mounted to the lower housing within the cavity, comprising a first means for actuating the pawl to release the ratchet and a first electromechanical means for selectively actuating the first pawl-actuating means without a manually operable lever;

an interior latch release and locking assembly, mounted to the latch cover within the cavity, comprising a second means for actuating the pawl to release the ratchet, means for connecting an inside release handle to the second pawl-actuating means, and a second electromechanical means for selectively coupling or de-coupling the second pawl-actuating means from the handle-connecting means, the interior latch release and locking assembly being selectively operable to move between an unlocked state, wherein the handle-connecting means is kinematically coupled to the second pawl-actuating means, and a locked state, wherein the handle-connecting means is decoupled from the second pawl-actuating means; and means comprising an arm on the pawl for driving the second electro-mechanical means into the unlocked state from the locked state, whenever the pawl is actuated to release the ratchet.

15. A latch according to claim 14, wherein:

the first electromechanical means includes an electric motor with a worm screw on the output shaft of the electric motor; and the first pawl-actuating means includes a first gear, rotatably mounted to the surface of the latch housing within the cavity and coupled to the worm screw, and a pin, extending from the surface of the first gear and abutting a portion of the pawl extending into the interior cavity so that rotating the first gear actuates the pawl.

16. A latch according to claim 15, wherein the first gear can be actuated by cable means, in addition to the first electromechanical means.

17. A latch according to claim 16, wherein the cable means include an emergency cable coupled at a first end to the first gear and at a second end, a key cylinder, whereby rotating the key cylinder actuates the first gear.

18. A latch according to claim 17, wherein the key cylinder is mounted to at least one of the exterior of a vehicle door and an outside vehicle door handle.

19. A latch according to claim 14, wherein:

the second pawl-actuating means includes an auxiliary inside release lever, rotatably mounted to the lower housing within the cavity and operable to actuate the pawl;

the handle-connecting means comprises an inside release lever having a first end and a second end, the first end being rotatably mounted to the auxiliary inside release lever and the second end being connected to a cable;

the second electromechanical means includes an electric motor with a worm screw on the output shaft of the electric motor, a second gear rotatably mounted to the surface of the tower housing within the cavity, driven by the worm screw, and a door lock link, rotatably coupled at a first end to the second gear and moveable between a first position where the second end engages a hook on the auxiliary inside release lever so that actuating the door lock link also actuates the auxiliary inside release lever, and a second position where the second end is disengaged from the hook on the auxiliary inside release lever, so that the door lock link rotates freely.

20. A latch for an automotive door, comprising:

a latch housing having a channel adapted to receive a striker;

a ratchet and pawl, each of the ratchet and pawl pivotally mounted to the housing, the ratchet and pawl cooperatively operable to move between a latched position to hold the striker in the channel, and a released position to permit the striker to exit the channel, the ratchet and pawl being biased towards the latched position;

an exterior latch release mechanism including a first gear for actuating the pawl to release the ratchet and a first electromechanical assembly for selectively driving the first gear to release the ratchet without a manually operable lever;

an interior latch release and locking assembly including an inside release lever, an auxiliary inside release lever for actuating the pawl to release the ratchet, and a second electromechanical assembly for selectively coupling or de-coupling the auxiliary inside release lever with the inside release lever, said second electromechanical assembly including a motor, a second gear operatively coupled to the motor, and a door lock link rotatably connected at a first thereof end to the second gear and moveable between a first position where a second end of the link couples the auxiliary inside release lever with the inside release lever and a second position where the second end of the link does not couple the auxiliary inside release lever with the inside release lever; and an arm on the pawl for driving the second electro-mechanical means into the unlocked state from the locked state, whenever the pawl is actuated to release the ratchet.

21. A latch according to claim 20, including a cable connected to an arm of the first gear, the first gear arm freewheeling when the first gear is actuated by the first electromechanical assembly.

22. A latch according to claim 20, including an electronic controller for actuating the first electromechanical assembly of the exterior latch release mechanism and a switch, engageable from the exterior of the vehicle, electrically connected to the controller for signaling actuation of the exterior release mechanism.

23. A latch according to claim 20, including:

a controller;

a switch located on the exterior of the automotive door and electrically connected to the controller;

wherein said controller is programmed to disable the switch in response to a predetermined "lock" signal and enable the pressure sensitive switch in response to a pre-determined "unlock" signal, in which case the controller energizes the exterior latch release mechanism to release the ratchet in the event the pressure sensitive switch is actuated.

* * * * *